United States Patent [19]

Stillman et al.

[11] 3,864,361

[45] Feb. 4, 1975

[54] STEREOSPECIFIC HYDROGENATION PROCESS USING UNSUPPORTED $RuO_2$ CATALYST

[75] Inventors: Neil W. Stillman, Madison; Edmond R. Osgood, Mentor, both of Ohio

[73] Assignee: Diamond Shamrock Corporation, Cleveland, Ohio

[22] Filed: Feb. 15, 1973

[21] Appl. No.: 332,721

[52] U.S. Cl. .............................................. 260/326.8
[51] Int. Cl. ......................................... C07d 27/04
[58] Field of Search ................................ 260/326.8

[56] References Cited
UNITED STATES PATENTS
3,177,258  4/1965  Rylander et al. ............ 260/326.8 X

*Primary Examiner*—Joseph A. Narcavage
*Attorney, Agent, or Firm*—Helen P. Brush

[57] ABSTRACT 2,5-Dimethylpyrrolidine predominantly as the cis-isomer is prepared by the reduction of 2,5-dimethylpyrrole under moderate temperature and pressure conditions, employing a finely-divided, unsupported $RuO_2$ as the sole hydrogenation catalyst.

5 Claims, No Drawings

STEREOSPECIFIC HYDROGENATION PROCESS USING UNSUPPORTED RUO₂ CATALYST

BACKGROUND OF THE INVENTION

1. Field of the Invention

This invention relates to an improved process for preparing cis-2,5-dimethylpyrrolidine in optimum yield by the reduction of 2,5-dimethylpyrrole and particularly relates to an improved hydrogenation process under moderate temperature and pressure conditions employing a simply prepared, unsupported ruthenium dioxide as the hydrogenation catalyst.

2. Description of the Prior Art

Supported platinum oxide or reduced rhodium long have been the preferred catalysts for hydrogenation of aromatic compounds and particularly pyrroles, pyrrolines, and the like, at low hydrogen pressure and in acid media. Thus, as reported by Evans in JACS, 73, 5231 (1951), cis-2,5-dimethylpyrrolidine can be prepared by the catalytic reduction of 2,5-dimethylpyrrole at a hydrogenation pressure of about 45 psig using Adams (platinic oxide) catalyst in glacial acetic acid. Likewise, as reported by Overberger et al in JACS, 77, 4102 (1955), cis-2,5-dimethylpyrrolidine can be prepared by catalytic reduction of 2,5-dimethylpyrrole at a hydrogen pressure of 40 psig using a 5 percent rhodium on alumina catalyst in glacial acetic acid.

More recently, Rylander et al in U.S. Pat. No. 3,177,258, issued Apr. 6, 1965, suggest the hydrogenation of pyrroles using the catalyst containing ruthenium in combination with another platinum group metal. Numerous other patents as, for example, U.S. Pat. Nos. 2,606,925; 2,606,926; 2,487,054; 2,828,335; and 3,192,262 have disclosed the use of ruthenium as dioxide or as the metal on a support such as carbon or alumina as a catalyst for the reduction of a number of ring systems at moderately high pressures and temperatures particularly in the saturation of aromatic carbocyclic compounds such as benzene and substituted benzenes.

We have now found that a heterocyclic hydrocarbon compound, specifically 2,5-dimethylpyrrole, can be converted at moderate temperature and pressure to its saturated derivative, i.e., 2,5-dimethylpyrrolidine in commercially feasible yields and predominantly as the cis-isomer by employing an unsupported ruthenium dioxide as the hydrogenation catalyst.

SUMMARY OF THE INVENTION

Accordingly, this invention provides an improved process for the catalytic stereospecific hydrogenation of 2,5-dimethylpyrrole to its saturated derivative 2,5-dimethylpyrrolidine predominantly as the cis-isomer wherein a simply prepared, finely-divided unsupported ruthenium dioxide is employed as the catalyst. Hydrogen pressures of 200–1,000 psig generally may be utilized. The process may be effectively carried out in the absence of any inert liquid reaction media. Good, practical yields of the desired saturated product are obtained, e.g., 2,5-dialkylpyrrolidine having cis-isomer contents ranging from about 90 percent to about 98 percent are typical.

DESCRIPTION OF THE PREFERRED EMBODIMENTS

The ruthenium dioxide which is employed as the hydrogenation catalyst in the process of this invention is a highly crystalline powder having a bulk density which is no greater than 2.0 g/cc, and preferably is less than 1.0 g/cc. Likewise, it preferably has an average crystallite size ranging up to about 1,000 A°.

The ruthenium dioxide catalyst of the process of this invention is prepared according to the general procedure outlined in Canadian Pat. No. 860,855 for "Oxide Resistor Metals," issued Jan. 12, 1971, to Hamish C. Angus and Peter E. Gainsbury, which method comprises treating a ruthenium chloride solution with sodium hydroxide until it is alkaline, then reacidifying the mixture to a pH of 6–7 by the addition of hydrochloric acid. The resultant reaction mixture is filtered and the separated solids are washed thoroughly with hot water to remove sodium chloride. The solids are then heated at 450°–600° C to expel water of crystallization. The dried material may then be ground or otherwise comminuted if a still finer particle size is desired.

The amount of ruthenium dioxide employed as the catalyst may range generally from about 0.2 percent to about 0.8 percent, based on the weight of the 2,5-dimethylpyrrole to be reduced. This amount of catalyst will supply a calculated amount of from about 0.15 to about 0.60 percent ruthenium metal, by weight of the unsaturated reactant.

It is advantageous in many instances to incorporate in the hydrogenation reaction mixture a minor quantity of a finely divided alumina powder, which material serves as a filtering aid for separating and recovering the catalyst upon completion of the reaction. Suitable commercially available aluminum powders are, for example, the CATAPAL aluminas manufactured by Continental Oil Company. When employed, the alumina powder typically is incorporated in an amount ranging from 0.50 to 1.0 percent by weight of the dimethylpyrrole reactant. It should be noted that when alumina is employed in the reaction mixture, no impregnation thereof with the ruthenium dioxide is believed to occur nor is there any other form of intimate blending of the dioxide with the alumina component. Within the hydrogenation reaction system, the ruthenium dioxide and the alumina exist as separate moieties merely in admixture within the system.

Hydrogenation pressures of 200–1,000 psig and reaction temperatures of 75°–160° C generally may be employed, with pressures of 300–600 psig and temperatures of 100°–150° C being particularly satisfactory and preferred at present. Good practical yields of the desired saturated product typically may be obtained in reaction times ranging from about 10 to 16 hours.

As pointed out previously herein, no water or other inert solvent medium need be employed in the reaction system to successfully carry out the reaction.

After hydrogenation is complete, the catalyst is separated from the reaction mixture and the filtrate is analyzed by vapor phase chromatography using an Amine 220 Column (Supelco, Inc., Bellefonte, Pennsylvania). It is operated for the quantitative analysis of cis- and trans-2,5-dimethylpyrrolidine and also for the quantitative analysis of the 2,5-dimethylpyrrole starting material.

The process of this invention provides a simple method for obtaining commercially feasible yields of cis-2,5-dimethylpyrrolidine and has particular commercial importance due to the fact that the catalyst does not become completely exhausted during any one hydrogenation reaction, and may be reclaimed and used in further reactions.

By comparison to commercially available ruthenium dioxide whether supplied unsupported or on a support, the ruthenium dioxide catalyst employed in the process of this invention provides improved overall yields of saturated dimethylpyrrolidine product and particularly in the percentage of cis-isomer contained therein.

For a fuller understanding of the nature and objects of this invention, reference may be made to the following examples which are given to illustrate the invention but are not to be construed as limiting the scope thereof.

EXAMPLE 1

A 10-liter flask is charged with 5.5 liters of water and 600 ml of 1 molar hydrochloric acid, to which 725 g of $RuCl_3 \cdot xH_2O$ (38% ruthenium metal, by weight) is added and dissolved with agitation. While agitation is continued, 20% aqueous caustic soda is slowly added to the resulting solution until it attains a pH of 8.6, a precipitate of ruthenium hydroxide forming. The pH of the reaction mixture is then lowered to approximately 6.0 by the addition of concentrated hydrochloric acid.

The reaction mixture is filtered and the precipitate is recovered and dried in the oven at 140° C. The dried precipitate is then reslurried in water and refiltered. It is dry-fired at 450° C for 5 hours and then at 600° C for 6 hours. After firing, the material is ground through a 100-mesh screen. It has a bulk density of 0.81 g/cc. It is determined to be ruthenium dioxide ($RuO_2$) by x-ray diffraction analysis.

A 250-ml stainless steel autoclave provided with a nickel sleeve is charged with 44 g of freshly distilled 2,5-dimethylpyrrole and 0.1 g of the above-described ruthenium dioxide (supplies 0.17% ruthenium metal, based on the weight of the dimethylpyrrole reactant). The autoclave is sealed, purged twice with nitrogen and then with hydrogen and is finally pressured with hydrogen to 400 psig.

The reaction mixture is heated at a rate of 2°–4° C/minute until it attains a temperature of 120° C. It is then heated slowly until a reaction temperature of 133° C is reached. The reaction pressure rises to about 550 psig during the initial heating cycle, but drops to 400 psig when hydrogen absorption chemically begins to proceed at a consistent rate. The reaction is continued at about 133°–136° C and 400 psig pressure until the reaction is complete based on the hydrogen consumed (indicated by the pressure drop in the hydrogen reservoir). The reaction is completed in about 12 hours.

The autoclave is cooled and vented. The reaction mixture is removed and filtered repeatedly to separate and reclaim the catalyst. The filtrate is analyzed by vapor phase chromatography. The chromatographic column contains a 3/16 inch × 6 feet spiral tube packed with 5% Amine 220 (Supelco, Inc.) on Chromosorb "G" High Performance (80–100 mesh). It is operated at a temperature of 70°–90° C for the quantitative analysis of cis- and trans-2,5-dimethylpyrrolidine and at a temperature of 150°–160° C for quantitative analysis of residual 2,5-dimethylpyrrole. The cis-isomer elutes first and is followed shortly by the trans-isomer after which the column temperature is immediately raised to 150°–160° C. Any residual pyrrole present will elute about 6 minutes after the pyrrolidine isomers and negligible traces of other components under these conditions. The percent conversion is determined from the amount of residual pyrrole reclaimed.

Using this procedure, the product of this example is recovered in 87% yield. This product contains 97%, by weight, of the cis-isomer, indicating the efficiency of the catalyst for stereospecific hydrogenation.

EXAMPLE 2

Employing the same equipment and general procedure as set forth in Example 1, freshly distilled 2,5-dimethylpyrrole (44 g) is hydrogenated at 133°–142° C and 400 psig pressure, employing 0.1 g of catalyst that has been reclaimed from the reaction of Example 1 and methanol-washed. Also, 0.5 g of alumina is incorporated in the reaction mixture as a filtering aid for improving catalyst separation. The reaction is completed in approximately 12 ½ hours.

The reaction mixture is separated quickly by filtration. Chromatographic analysis of the filtrate indicates the overall recovery of the 2,5-dimethylpyrrolidine product to be 66%. Approximately 99% by weight of this product is the cis-isomer.

EXAMPLE 3

The catalyst used in Example 2 is washed with methanol until the washings test negative for the presence of pyrrole or pyrrolidine compounds. The catalyst mixture consisting of $RuO_2$ and alumina is then assayed by x-ray fluorescence and determined to contain 0.0293 g ruthenium metal. The hydrogenation experiment is repeated as described previously, using the reclaimed catalyst together with 0.061 g of fresh ruthenium dioxide (prepared as described in Example 1) The total quantity of catalyst supplies about 0.175% ruthenium metal, based on the weight of the dimethylpyrrole reactant. The reaction is conducted at 130° C and at a hydrogen pressure of 400 psig for 13 hours.

The reactor is then cooled and the contents discharged and filtered to separate the catalyst. The filtrate is analyzed as previously described. The overall yield of 2,5-dimethylpyrrolidine obtained is 88%, and greater than 94% of this product, by weight, is the cis-isomer.

EXAMPLE 4

The hydrogenation reaction as set forth in the previous examples is again repeated, employing the methanolwashed catalyst reclaimed from the reaction of Example 3.

The reaction is conducted at 133° C and at 400 psig hydrogen pressure for approximately 14 hours. The reactor contents are then recovered and filtered. Vapor phase chromatographic analysis of the filtrate determines that the overall yield of product is 88% with the percentage of cis-isomer in this product amounting to 92%, by weight.

EXAMPLE 5

A finely-divided ruthenium dioxide is prepared as outlined in Example 1, except that the quantity of aqueous caustic soda required to adjust the pH of the reaction mixture to the proper level is added at a much faster rate. After filtering and washing the product precipitate, it is dry-fired at 450° C for 2 hours. The bulk density of the dried $RuO_2$ product is 1.75 g/cc.

Employing 0.1 g of this compound, 2,5-dimethylpyrrole (44 g) is hydrogenated as described in Example 1. The reaction is carried out at 130° C and 400 psig for 12 hours.

The product filtrate analyzed by vapor phase chromatography as previously described is found to contain 81% of the theoretical yield of 2,5-dimethylpyrrolidine, 97 wt % of which is the cis-isomer.

EXAMPLE 6

For comparative purposes, 2,5-dimethylpyrrole was hydrogenated as described previously, employing a commercially-used ruthenium metal catalyst (1%) on an alumina support (catalyst No. 20398, supplied by Englehard Industries). The quantity of this supported catalyst used supplied 0.06% ruthenium metal, based on the weight of the dimethylpyrrole. The hydrogenation was conducted at 155° C and at 400 psig pressure for 12 hours.

Analysis of the filtrate isolated from the reaction mixture shows the overall yield of 2,5-dimethylpyrrolidine to be 84%. Approximately 91% of this product, by weight, is the cis-isomer.

Thus, the ruthenium dioxide catalyst of this invention is at least as effective as a commercially-used ruthenium metal catalyst for the stereospecific conversion of 2,5-dimethylpyrrole to its saturated derivative, predominantly in the cis-isomer form.

Cis-2,5-dimethylpyrrolidine is a valuable intermediate in the production of herbicidally-active compounds.

It is to be understood that although the invention has been described with specific reference to particular embodiments thereof, it is not to be so limited, since changes and alterations therein may be made which are within the full intended scope of this invention as defined by the appended claims.

We claim:

1. A process for hydrogenating 2,5-dimethylpyrrole to 2,5-dimethylpyrrolidine which consists essentially of contacting said 2,5-dimethylpyrrole at a temperature of 75°–160° C and under a hydrogen pressure of 200–1,000 psig with from about 0.2 to 0.8 %, by weight of the 2,5-dimethylpyrrole, of an unsupported ruthenium dioxide as the sole hydrogenation catalyst, said ruthenium dioxide having an average crystallite size ranging up to about 1,000 A, and recovering the saturated 2,5-dimethylpyrrolidine product predominantly in cis-isomer form.

2. The process of claim 1 wherein the ruthenium dioxide catalyst employed has a bulk density no greater than 2.0 g/cc.

3. The process of claim 1 wherein from about 0.50 to 1.0% of a finely-divided alumina powder is additionally incorporated in the reaction mixture as a filter aid.

4. The process of claim 1 wherein greater than 90% of the saturated product recovered is cis-2,5-dimethylpyrrolidine.

5. The process of claim 1 which is conducted for a time period of 10–16 hours.

* * * * *